(12) United States Patent
Sehgal et al.

(10) Patent No.: US 11,782,910 B2
(45) Date of Patent: Oct. 10, 2023

(54) SYSTEM AND METHOD FOR DYNAMIC INFERENCE COLLABORATION

(71) Applicant: Samsung Electronics Co., Ltd., Suwon-si (KR)

(72) Inventors: Akshat Sehgal, Fremont, CA (US); Shankar Narayan Venkatesan, Santa Clara, CA (US); Sojan Ponthanplavi Razallian, Sunnyvale, CA (US); Artem Boykov, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 17/031,463

(22) Filed: Sep. 24, 2020

(65) Prior Publication Data

US 2021/0149893 A1 May 20, 2021

Related U.S. Application Data

(60) Provisional application No. 62/936,144, filed on Nov. 15, 2019.

(51) Int. Cl.
| | |
|---|---|
| *G06F 16/908* | (2019.01) |
| *G06F 16/242* | (2019.01) |
| *G06N 5/04* | (2023.01) |
| *G06F 16/909* | (2019.01) |
| *G06N 5/02* | (2023.01) |

(52) U.S. Cl.
CPC ........ *G06F 16/2425* (2019.01); *G06F 16/908* (2019.01); *G06F 16/909* (2019.01); *G06N 5/02* (2013.01); *G06N 5/04* (2013.01)

(58) Field of Classification Search
None
See application file for complete search history.

(56) References Cited

U.S. PATENT DOCUMENTS

| | | | | |
|---|---|---|---|---|
| 2010/0281025 | A1* | 11/2010 | Tsatsou | G06F 16/335 707/E17.071 |
| 2012/0303600 | A1* | 11/2012 | Mukhopadhyay | G06F 40/253 707/706 |
| 2020/0142888 | A1 | 5/2020 | Alakuijala et al. | |
| 2021/0065055 | A1* | 3/2021 | Yan | G06F 9/451 |

FOREIGN PATENT DOCUMENTS

| | | |
|---|---|---|
| KR | 10-1437329 B1 | 9/2014 |
| KR | 10-2016-0104145 A | 9/2016 |
| KR | 10-2103273 B1 | 4/2020 |
| KR | 10-2119404 B1 | 6/2020 |
| WO | 02/099597 A2 | 12/2002 |

\* cited by examiner

*Primary Examiner* — Thu N Nguyen (57) ABSTRACT

An electronic device includes at least one memory and at least one processor coupled to the at least one memory. The at least one memory is configured to store a database. The at least one processor is configured to receive content metadata from a content provider based on a query from a first device. The at least one processor is also configured to identify a scenario and a keyword associated with the content metadata. The at least one processor is further configured to generate a recommendation based at least in part on content inferences associated with the first device stored in the database through relating the scenario to previously-identified scenarios and relating the keyword to previously-identified keywords. In addition, the at least one processor is configured to provide the recommendation.

20 Claims, 6 Drawing Sheets

SYSTEM AND METHOD FOR DYNAMIC INFERENCE COLLABORATION

CROSS-REFERENCE TO RELATED APPLICATION AND CLAIM OF PRIORITY

This application claims priority under 35 U.S.C. § 119(e) to U.S. Provisional Patent Application No. 62/936,144 filed on Nov. 15, 2019. The above-identified provisional patent application is hereby incorporated by reference in its entirety.

TECHNICAL FIELD

This disclosure relates generally to content recommendation systems. More specifically, this disclosure relates to a dynamic inference collaboration mechanism across devices for cognitive content suggestions and service discovery.

BACKGROUND

Techniques for interacting with computing devices and other electronic devices are continually improving in order to conform to more natural approaches. For example, devices such as personal computers, smartphones, tablet computers, head mounted displays, wireless speakers, appliances, and the like can be used to provide recommendations to users. These recommendations may typically include reminders, past preferences, and the like with little intelligent analysis, resulting in generic recommendations that are often device-specific.

SUMMARY

This disclosure provides a system and method for dynamic inference collaboration.

In a first embodiment, an electronic device includes at least one memory and at least one processor coupled to the at least one memory. The at least one memory is configured to store a database. The at least one processor is configured to receive content metadata from a content provider based on a query from a first device. The at least one processor is also configured to identify a scenario and a keyword associated with the content metadata. The at least one processor is further configured to generate a recommendation based at least in part on content inferences associated with the first device stored in the database through relating the scenario to previously-identified scenarios and relating the keyword to previously-identified keywords. In addition, the at least one processor is configured to provide the recommendation.

In a second embodiment, a method includes receiving content metadata from a content provider based on a query from a first device. The method also includes identifying a scenario and a keyword associated with the content metadata. The method further includes generating a recommendation based at least in part on content inferences associated with the first device stored in a database through relating the scenario to previously-identified scenarios and relating the keyword to previously-identified keywords. In addition, the method includes providing the recommendation.

In a third embodiment, a non-transitory computer readable medium contains instructions that when executed cause at least one processor to receive content metadata from a content provider based on a query from a first device. The medium also contains instructions that when executed cause the at least one processor to identify a scenario and a keyword associated with the content metadata. The medium further contains instructions that when executed cause the at least one processor to generate a recommendation based at least in part on content inferences associated with the first device stored in a database through relating the scenario to previously-identified scenarios and relating the keyword to previously-identified keywords. In addition, the medium contains instructions that when executed cause the at least one processor to provide the recommendation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted as a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Embodiments of this disclosure describe recommendation systems that provide personalized recommendations to electronic devices. The personalized recommendations are associated with content from one or more content providers. Electronic devices, such as personal computers, smartphones, tablet computers, head mounted displays, wireless speakers, appliances, and the like, can access content from one or more content providers. A content provider is an entity that provides content, such as multi-media content, information, or services. In some cases, a content provider can be an application or server that functions as such as a third-party to a user. The recommendations of a recommendation system can be based on various inferences and scenarios that are identified using information from one or more electronic devices that are associated with a user. For example, the recommendations can be based on the content inferences that relate a scenario to previously-identified scenarios and relate the keyword to previously-identified keywords. The recommendations can be on-demand and based on dynamically-curated suggestions of content and services for a given scenario.

Additionally, the recommendations can be given to one electronic device that is included in a multi-device environment (MDE) associated with a single user. The electronic devices in an MDE can include any of the electronic devices described above. For example, a recommendation system can identify a scenario associated with a user, such as by determining that the user is at work based on his or her location (as indicated by a smartphone that is within an MDE of the user) and time of day. Based on identifying the scenario of "at work," the recommendation system can generate a recommendation of a particular song, such as by playing the song on a smart speaker located in the office where the user is working (and where the smart speaker is within the same MDE as the user's smartphone).

According to some embodiments of this disclosure, a recommendation system can be associated with a digital personal assistant (such as BIXBY by SAMSUNG, GOOGLE ASSISTANT by GOOGLE, or ALEXA by AMAZON). The digital personal assistant can be linked with one or more devices of the MDE associated with a particular user. For example, the digital personal assistant can resemble a host application that is acting as a hub for user information, notifications, recommendations, and other content across one or more devices. The digital personal assistant can be an intelligent assistant or digital assistance voice client, an intelligent assistant or digital assistant home user interface or recommendation user interface, and the like. The digital personal assistant can be associated with a smartphone, smart devices, car infotainment systems, smart home devices, wearables, smart Speaker, Internet of Thing (IoT) devices, smart home appliances, smart device enablers such as Smart things devices and the like. In some embodiments, the digital personal assistant can receive a query from the user requesting content from a content provider. The query can be based on a spoken or typed utterance using natural language. The query can specify that the digital personal assistant is to use a particular content provider to provide the requested content. For instance, the query of the user can include a specific content provider, such as a specific restaurant search provider (YELP), a specific music provider (IHEARTRADIO or SPOTIFY), a specific video streaming provider (NETFLIX), and the like. In other embodiments, the query can be for content without specifying that the content is to be sourced from a particular content provider. For example, the query can be a generic request for content that does not specify which content provider to use, such as "please provide a list of nearby restaurants."

Note that the digital personal assistant can receive a query for content from a user, which may take various forms. For example, the query may include a request for specific content, a generic content query, or an indication of an activity with which the user is involved and for which the user would like to receive content. The query can be transmitted from one of the electronic devices of the MDE to a content provider. The query can include various parameters, such as metadata (like information associated with the query) and information about the electronic device from which the query originated. The digital personal assistant can identify a keyword and a category (such as a domain) that is associated with the query, where the category represents the type of content or type of content owner. For instance, the category can be music, videos, news, sports, a type of information, a type of a service, and the like. After the digital personal assistant receives the query, the digital personal assistant can infer information about the query. The digital personal assistant uses that information to generate a recommendation of additional content or services on any of the electronic devices within the MDE of the user. For example, the digital personal assistant can use the query that is received on one electronic device of the MDE to provide a recommendation on another device of the MDE.

Figure 1:
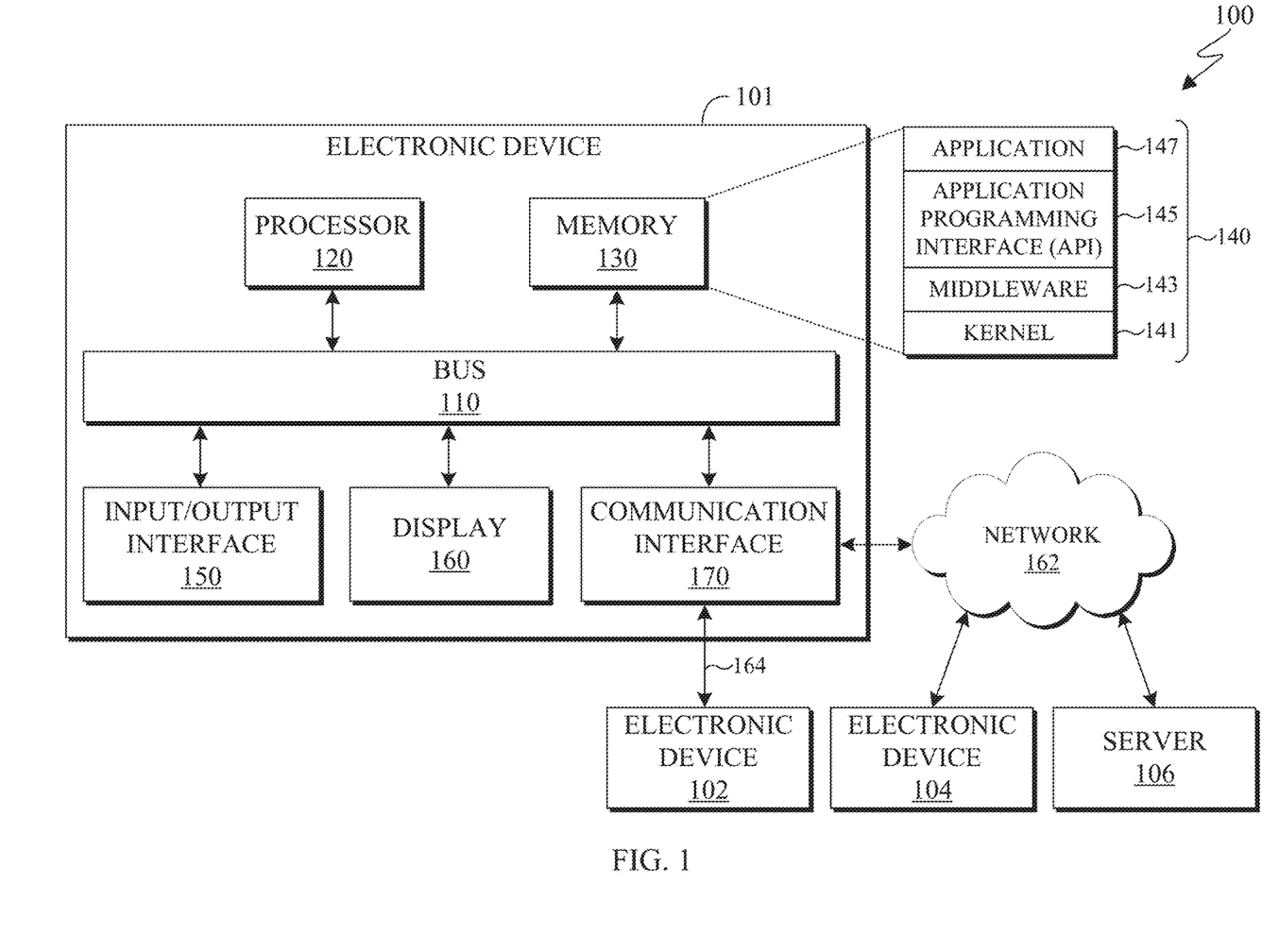
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, and a communication interface 170. In some embodiments, the electronic device 101 may exclude at least one of these components or may add at least one other component. The bus 110 includes a circuit for connecting the components 120-170 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor can be a graphics processor unit (GPU). In accordance with various embodiments of this disclosure, the processor 120 can control the electronic device 101 to receive metadata from one or more content owners and/or electronic devices. The processor 120 can also generate a database, such as a graph database, that includes content inferences associated with one or more electronic devices associated with a user. In some embodiments, the database can include content inferences associated with multiple electronic devices within an MDE associated with a single user. The processor 120 can further generate recommendations for a given scenario and provide the recommendations to any of the electronic devices within the MDE.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources.

The application 147 may include one or more applications that, among other things, generate recommendations. For example, the application 147 can represent a digital personal assistant that acts as a hub for user information, notifications, recommendations, and other content. In some cases, the digital personal assistant can be displayed as a home screen or other screen on the electronic device 101 that interacts with other applications installed in the memory 130 of the electronic device 101. The digital personal assistant can also interact with one or more outside services, such as one or more services offered by mobile network service providers, device manufacturers, cloud computing services, or other service providers. The digital personal assistant may optionally operate as a component of the operating system of the electronic device 101. The application 147 can also include other applications pre-installed on the electronic device 101 or installed by a user of the electronic device 101. These applications can include applications such as those that provide travel services, music services, news services, shopping services, video services, or other services. These functions can be performed by a single application or by multiple applications that each carry out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-170 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
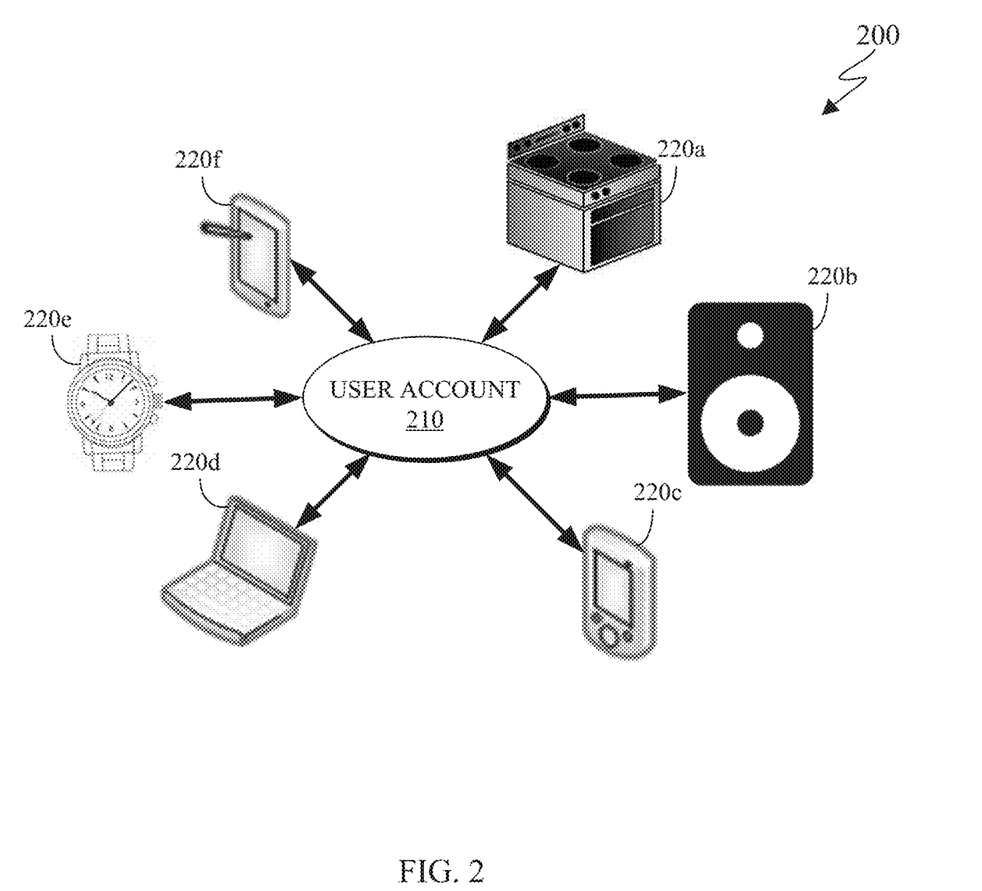
FIG. 2 illustrates an example multi-deice environment in accordance with this disclosure.

FIG. 2 illustrates an example MDE 200 in accordance with this disclosure. In this example, the MDE 200 illustrates a single user account 210 that is associated with a particular user and with multiple electronic devices. The multiple electronic devices include an appliance 220a, a smart speaker 220b, a smartphone 220c, a laptop 220d, a smartwatch 220e, and a tablet computer 220f (which are collectively referred to as electronic devices 220). For ease of explanation, each of the electronic devices 220 can include internal components that are the same as or similar to the electronic device 101 of FIG. 1. Each of the electronic devices can be connected or otherwise associated with the user account 210 in any suitable manner, such as via a username and password.

In some embodiments, the user account 210 is associated with a digital personal assistant that is linked to one or more of the electronic devices 220. The digital personal assistant can receive various queries for content from the user and provide the requested content to the user. Additionally, the digital personal assistant can provide recommendations to the user. Since the electronic devices 220 are within the MDE 200, the queries that are received by the digital personal assistant can be gathered by a recommendation system. The recommendation system, as discussed in greater detail below with reference to FIGS. 3 and 4, can generate tailored recommendations that are provided to one or more electronic devices of the MDE 200. For example, based on a query provided to the smartphone 220c, the recommendation system can generate a recommendation and deliver the recommendation to the smartphone 220c. As another example, based on a query provided to the smartphone 220c, the recommendation system can generate a recommendation and deliver the recommendation to another device in the MDE 200, such as the smart speaker 220b. As a particular example, if the query to the smartphone 220c is associated with a scenario of studying, the recommendation system can generate and deliver a recommendation of a certain song, artist, playlist, or genre of music to the smart speaker 220b while the user is studying. Thus, the recommendation system can identify insights from the interconnected devices of the MDE 200 as illustrated in FIG. 2 to generate recommendations of specific content and services to be recommended to any device within the MDE 200, now or at a later point in time.

Moreover, the electronic devices 220 can request and receive content from one or more content providers. A content provider can be a provider of various services or content, such a music, movies, restaurant information, news, entertainment/games, and the like. Since the electronic devices 220 are within the MDE 200, the queries that are received and provided by content providers can be gathered by the recommendation system. The recommendation system can generate a tailored recommendation that is provided to one or more of the electronic devices of the MDE 200. For example, if the user associated with the user account 210 requests a list of restaurants serving a certain type of cuisine from a particular content provider on one of the electronic devices 220, the recommendation system can provide the user with a recommendation for a similar type of cuisine the next time the user accesses the content provider that previously provided the list of restaurants on any of the electronic devices 220 of the MDE 200.

Although FIG. 2 illustrates one example of an MDE 200, various changes may be made to FIG. 2. For example, the MDE 200 may include any suitable number of electronic devices 220, including a single electronic device 220. Also, the specific types of electronic devices 220 shown in FIG. 2 are for illustration only.

Figure 3:
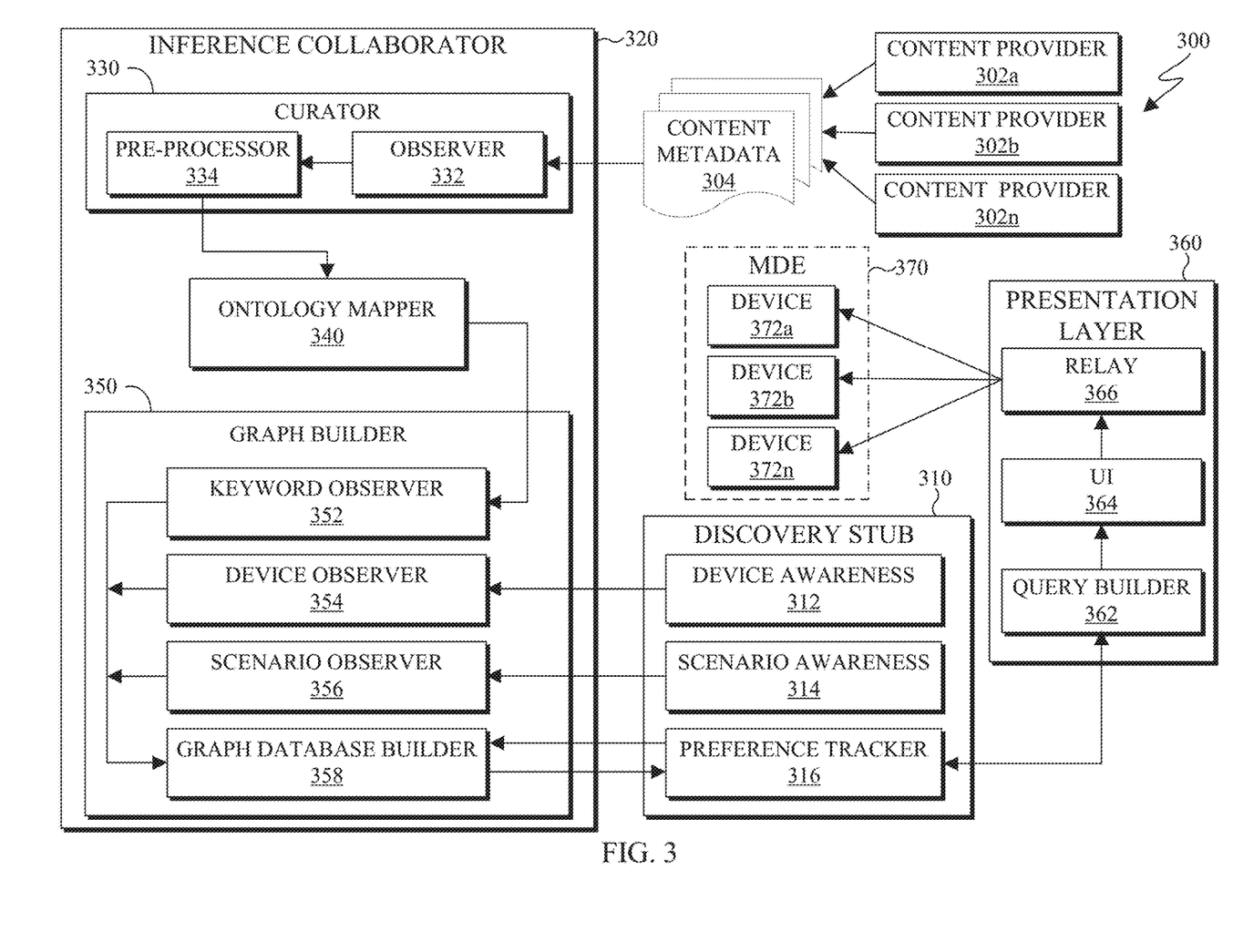
FIG. 3 illustrates an example recommendation system for generating a recommendation in accordance with this disclosure.

FIG. 3 illustrates an example recommendation system 300 for generating a recommendation in accordance with this disclosure. For ease of explanation, the recommendation system 300 may be described as being used in the network configuration 100 of FIG. 1, which might be used in or with the MDE 200 of FIG. 2. However, the recommendation system 300 may be used with any suitable device(s) and in any suitable system(s).

As shown in FIG. 3, the recommendation system 300 includes a discovery stub 310, an inference collaborator 320, and a presentation layer 360. In some embodiments, the discovery stub 310, the inference collaborator 320, and the presentation layer 360 can be components of an application on, for example, the server 106 and associated with a digital personal assistant that is used by the electronic device 101 of FIG. 1 and/or the electronic devices 220 of FIG. 2. These components can interact with other applications and with outside services, such as services offered by content providers 302a, 302b, 302n. Note, however, that the discovery stub 310, the inference collaborator 320, and the presentation layer 360 can be executed or otherwise provided by other devices, such as the electronic devices 101, 102, 104, and/or 220.

One or more content providers, such as the content providers 302a, 302b, 302n (collectively referred to as the content providers 302) provide content metadata 304 to the recommendation system 300. The content metadata 304 may, for example, be provided to the recommendation system 300 in response to receiving a query and providing requested content to one of multiple electronic devices 372a, 372b, 372n. The electronic devices 372a, 372b, 372n (collectively referred to as electronic devices 372) may be the same as or similar to the electronic devices 220 of FIG. 2 and/or the electronic devices 101, 102, and 104 of FIG. 1. Thus, when one of the electronic devices 372 requests content from any of the content providers 302, the content metadata 304 corresponding to the request can be provided to the recommendation system 300 from the content provider 302.

Each content provider 302 may manage access to a central repository of data or provide a service. Each content provider 302 may represent any organization that supplies information or services to end users via electronic devices over one or more networks, such as the Internet. As particular examples, the content provider 302a can be music provider such as SPOTIFY, which can provide content such as music streaming and podcasts to end users. The content provider 302b can be a news service such as FOX NEWS, CNN, MSNBC, NPR, local news, which can provide local, national, and international news to end users. Another content provider is movie provider, such as NETFLIX, which can provide videos and television shows via a subscription-based streaming service. A restaurant search provider, such as YELP, is another content provider, which can provide crowd-sourced reviews of businesses.

In the following example, assume that a selected content provider 302 is a music streaming service provider, such as SPOTIFY. One example of the content metadata 304 that might be provided from the content provider 302 is shown below as Syntax (1). Here, the content metadata 304 is associated with a query from one of the electronic devices 372 for content from a specific content provider, such as specific music streaming service. The content metadata 304 specifies that the metadata 304 is from a specific content provider and that the requested content is from particular artist, namely Carly Rae Jepsen.

```
Syntax                                              (1)
{ "artist":
    "href":                              "https://api.
ContentProvider.com/v1/artists/6sFIWsNpZYqfjUpaCgueju",
    "id": "6sFIWsNpZYqfjUpaCgueju",
    "name": "Carly Rae Jepsen",
    "type": "artist",
    "uri": "ContentProvider:artist:6sFIWsNpZYqfjUpaCgueju"
}
```

The inference collaborator 320 includes a curator 330, an ontology mapper 340, and a graph builder 350. The inference collaborator 320 processes the content metadata 304 and receives additional information from the discovery stub 310 to generate a graph database via the graph builder 350. The graph database includes content inferences associated with one or more of the electronic devices 372 of an MDE 370, a scenario associated with a query, the requested information, and an electronic device 372 that requested the information from the content provider 302.

The curator 330 includes an observer 332 and a pre-processor 334. The observer 332 receives the content metadata 304 from the content providers 302. The pre-processor 334 identifies keywords from the content metadata 304. The identified keywords represent words or phrases that describe the content provided to the user. Thus, the pre-processor 334 can identify and select certain information from the content metadata 304. For instance, example keywords that may be identified from the content metadata 304 are shown in Syntax (2) below. Note that the keywords shown in Syntax (2) include a name and a description or type associated with the name, such as artist. In another example, the type could be a restaurant and the name would be the name of the restaurant. In yet another example, the type could be a movie or a book, and the name would be the corresponding title.

```
Syntax                                              (2)
{
    "name": "Carly Rae Jepsen",
    "type": "artist"
}
```

Since different content providers 302 can use different terms with common meanings, the ontology mapper 340 can replace words from the content metadata 304 to generate a uniform ontology. For example, in the domain of music, the terms "record" and "album name" can denote the same or similar meaning. As another example, in the domain of music, the terms "artist," "band," "singer," and "vocalist" can denote the same or similar meaning. As yet another example, in the domain of news, the terms "article," "headline," and "blurb" can denote the same or similar meaning. As such, the ontology mapper 340 uses a remote knowledge graph to identify words with similar meanings that are used by different content providers 302 to describe and label elements in the content metadata 304. The ontology mapper 340 may also, if needed, select replacement words from the remote knowledge graph to create a uniform set of words that describe similar items from the content metadata 304. For Syntax (3) below shows an example where requested content from the content provider is associated with a music recording by an artist with the name Carly Rae Jepsen. The ontology mapper 340 sends Syntax (3) to the keyword observer 352, which can provide the keywords to the graph database builder 358.

```
Syntax                                              (3)
{
    "value": "Carly Rae Jepsen",
    "key": "thing.creativework.musicrecording.byartist.person.name "
},
{
    "value": "ContentProvider",
    "key": "thing.creativework.softwareapplication.name"
}
```

The graph builder 350 generates and updates a graph database based on the received information from the ontology mapper 340 (which itself is based on the content metadata 304) and received information from the discovery stub 310. The graph builder 350 includes a keyword observer 352, a device observer 354, a scenario observer 356, and a graph database builder 358. The discovery stub 310 includes a device awareness function 312, a scenario awareness function 314, and a preference tracker 316. In some embodiments, the discovery stub 310 gathers information from all of the electronic devices 372 within the MDE.

The device awareness function 312 identifies the type of electronic device that initiates each query sent to a content provider 302. The device type could be any of the electronic devices described above, such as a smartphone, an appliance, a smart speaker, and the like. For example, if the electronic device 372a is a smartphone and requests that a particular content provider play a song by a particular artist, the device awareness function 312 can identify the type of the electronic device 372a as a smartphone. The device awareness function 312 can also identify the specific identity of the electronic device. The identity of the electronic device 372a distinguishes that electronic device from other electronic devices in the MDE 370. The device awareness function 312 provides information, such as information indicating the identity and type of device, to the device observer 354.

The scenario awareness function 314 identifies patterns associated with the user based on the electronic devices 372 of the MDE 370. For example, the scenario awareness function 314 can identify a scenario associated with each query provided to a content provider 302. In some embodiments, the scenario awareness function 314 identifies the scenario based on a time associated with the query, information from one or more sensors of the electronic device that initiated the query (such as a location, movement data, and the like), information from the query itself, historical data, and the like. As particular examples, the scenario could be "bedtime" based on the time of day and historical data indicating the time that the user typically goes to sleep. The scenario could be "wake up" based on the time of day and historical data indicating that the user has not used the electronic device for a period of time prior to the query and the time that the user typically wakes up. The scenario could be "driving" based on an indication from a position sensor within the electronic device. The scenario could be "exercising" based on location information indicating that the electronic device is at a gym or that the electronic device is moving at a pace that corresponds to running, cycling, or swimming. The scenario could be "commuting to work" or "commuting from work" based on an indication from a position sensor within the electronic device, a time of day, a day of the week, and the like. The scenario could be "studying" or "working" based on information from the query itself (such as the user specifying "I am studying"), the location of the user, the time of day, and the like. In some embodiments, the scenario awareness function 314 can identify the scenario based on one or more entries in a calendar associated with the electronic devices 372 of the MDE 370. The scenario awareness function 314 provides information to the scenario observer 356.

The graph database builder 358 generates the graph database based on the information from the keyword observer 352, the device observer 354, and the scenario observer 356. For example, the graph database builder 358 can map the keywords from the content providers (obtained via the keyword observer 352) in a linked fashion to the electronic devices 372 that initiated the queries to the content providers 302 (obtained via the device observer 354) and the scenarios that are associated with the queries (obtained via the scenario observer 356). In some embodiments, the graph database builder 358 continually updates the graph database based on new content metadata 304 that is associated with queries by one or more of the electronic devices 372 to the content providers 302. The preference tracker 316 can also update the graph database based on predefined preferences of the user. In some embodiments, the preference tracker 316 updates the graph database in real-time.

The generated graph database is a database that uses graph structures for semantic queries. The graph database includes nodes, edges or relationship paths between the nodes, and properties to represent and store data. Relationships between the nodes allow data to be linked together directly and can allow for data to be retrieved in one operation. Graph databases allow for fast querying of data since the relationships are perpetually stored in the database itself. Since graph databases allow for relationships to be intuitively visualized, graph databases are useful for heavily-interconnected data. The graph database can be stored on the server 106, any of the electronic device 101, 102, 104, 220, 372, or other storage location(s). It should be noted that a generated graph database can be associated with a single user but can include information from one or more devices within a single MDE 370.

In some embodiments, each node of the graph database represents an electronic device, a category (such as a domain), a content provider, or a scenario. Each node can be related to one or more other nodes via suitable linking in the graph database. For example, a node representing an electronic device can be linked to one or more domains (such as music, news, movies, and the like) that the electronic device has previously accessed. A domain can be linked to one or more content providers as well as to one or more scenarios that indicate when the domain is accessed. Nodes corresponding to the content providers can specify requested information, which is used when generating recommendations. One example of a graph database is described in greater detail below with respect to FIG. 5.

The presentation layer 360 presents recommendations to one or more of the electronic devices 372 in the MDE 370 based on queries provided by one or more of the electronic devices 372. The presentation layer 360 includes a query builder 362, a user interface (UI) 364, and a relay 366. The query builder 362 generates a query that is used to access the generated graph database. In some embodiments, the query represents a Structured Query Language (SQL) request. The query is transmitted from the query builder 362 to the preference tracker 316, and the preference tracker 316 accesses the graph database using a unique key based on the query.

The unique key is used to access the graph database and identify content inferences. For example, the unique key can specify a particular scenario, an electronic device 372 of the MDE 370, a particular content provider 302, or a combination thereof. For example, Syntax (4) below describes a unique key that can be used to query the graph database and identify content inferences associated with a scenario of "wakeup" on a "mobile" device using a specific content provider such as a music streaming service.

Syntax (4)
Preference Tracker Sample QUERY:
RETURN(keywords) where SCENARIO="wake_up" and DEVICE="mobile" and PROVIDER= ContentProvider In response to receiving the unique key, the graph database builder 358 compares the content within the unique key to the content inferences that are within the graph database. For instance, if the unique key specifies a particular scenario and a particular keyword, the graph database builder 358 can return content to be used as a recommendation based on a content inference that shares the same scenario and keyword. As a particular example, if the unique key specifies a scenario of "wakeup" and the content provider is a music streaming service, such as "SPOTIFY," the graph database builder 358 can inspect the graph database to identify historical content that the user accessed while waking up and receiving content from the same content provider. The graph database builder 358 generates results, an example of which is shown in Syntax (5), and transmits the results to the preference tracker 316, which forwards the results to the query builder 362. The query builder 362 can select certain information from the results to generate a recommendation.

```
Syntax                                                          (5)
{
    "value":" Carly Rae Jepsen",
    "type": "thing.creativework.musicrecording.byartist.person.name",
    "provider": "ContentProvider",
    "category": "music",
    "device": "mobile",
    "scenario" : "wake_up"
}
```

The UI 364 receives the results from the query builder 362 and, based on the results, generates a recommendation for one or more of the electronic devices 372 in the MDE 370. In some embodiments, the UI 364 queries various content providers to generate the recommendation. For example, the UI 364 may query the API of one or more of the content providers 302 in order to personalize its recommendations. The results provided by the graph database are used by the UI 364 to qualify query parameters to personalize the recommendations.

The UI 364 also determines which of the electronic devices 372 in the MDE 370 to receive each recommendation. For example, in some embodiments, a recommendation can be delivered to the electronic device 372 that initiated a query with a content provider 302. In other embodiments, a recommendation can be delivered to one or more electronic devices 372 that did not initiate a query with a content provider 302. In still other embodiments, a recommendation can be delivered to the electronic device 372 that initiated a query with a content provider 302 and to one or more electronic devices 372 that did not initiate the query with the content provider 302.

In some cases, the UI 364 can generate recommendations such that each recommendation is tailored to the particular electronic device on which the recommendation is presented. For example, one or more of the electronic devices 372 in the MDE 370 may not include a display. As such, a recommendation may be presented in an audible manner rather than a displayed manner. The UI 364 can also generate recommendations such that each recommendation is tailored to a particular domain. For instance, if the domain is music, a recommendation could take the form of playing music on a designated electronic device 372 without further input from the user. As another example, if the domain is news, the recommendation take the form of playing the news on the designated electronic device 372 without further input from the user. Note that the news or music may correspond to historical data identified via the graph database. For example, the music could be related to a specific artist, genre, playlist, and the like, while the news could be related to local news, national news, international news, business news, sports, and the like.

In some embodiments, the UI 364 may typically generate recommendations that are tailored to the electronic device 372 that initiated the queries to the content providers 302. However, the results returned from the graph database builder 358 could indicate that a different electronic device 372 should receive a specific recommendation. In these cases, the UI 364 may modify a recommendation to correspond to the user interface associated with the other electronic device. For example, if the electronic device 372 that initiates a query includes a display but the graph database builder 358 indicates that another electronic device 372 without a display should receive the recommendation, the UI 364 would modify the recommendation to correspond to the other electronic device 372 that does not include a display.

The relay 366 receives recommendations and device identifiers from the UI 364. Each device identifier identifies which of the electronic devices 372 in the MDE 370 are to receive a recommendation. The relay 366 can then send each recommendation to the particular electronic device(s) 372 identified for that recommendation.

Each electronic device 372 can receive specific recommendations tailored to that specific device. For example, the electronic device 372a may not receive recommendations that are unrelated to the content accessed by the electronic device 372a. As a particular example, if the user uses the electronic device 372a only to play classical music while at work but listens to country music on the electronic device 372b while commuting to work, a recommendation to play country music may not be transmitted to the electronic device 372a. However, based on the location of the electronic device 372b (such as when the electronic device 372b is located at work), the recommendation system 300 can generate a recommendation to play classical music on the electronic device 372a without input by the user. Additionally, the electronic devices 372 within the MDE 370 may or may not receive information related to generating a recommendation.

The following are specific examples of how this functionality may be used. In one example, the electronic device 372a can initiate a query, such as "please play study music through a specific music streaming service," where the specific music streaming service can be a content provider, such as SPOTIFY. The UI 364 can receive results from the graph database, which are based on both historical data and the query from the electronic device 372a. The results can indicate that for a scenario of "study" and the specific content provider for streaming music, the electronic device 372b should play a certain artist. The recommendation system 300 identifies, based on results from the graph database, certain music (such as from a certain genera, artist, song, or the like) to play and which device in the MDE to play the music. For example, based on content inferences as indicated by the results from the graph database, the recommendation system 300 identifies that for the scenario of "study," the user historically listens to a specific genera of music via the specific music streaming service. Additionally, based on content inferences as indicated by the results from the graph database, the recommendation system 300 identifies the user has previously listened to music using the electronic device 372b while studying. As such, the UI 364 generates a recommendation that is transmitted to the electronic device 372b to start playing the identified music using the specific music streaming service.

As another example, the recommendation system 300 can receive a query from the user is "I am studying," via the electronic device 372a. Based on content inferences as indicated by the results from the graph database, the recommendation system 300 then rates the various domains (such as such as news and music) that the user has used while studying. The recommendation system 300 can rate the domains on frequency or which domain was used previously used. Based on the domain of music being used more frequently (or most recently) used, the recommendation system 300 can identify a certain type of music (such as the genera, artist, song, or the like) and a particular device of the MDE, via the content inferences as indicated by the results from the graph database and generate a recommendation to play the certain type of music on the electronic device 372b.

As yet another example, the electronic device 372a can initiate a query, such as "what are good some steak restaurants nearby according to YELP." The UI 364 receives the results from the graph database, which are based on both historical data and the query from the electronic device 372a, indicating a scenario of lunchtime and a location of the user. The next time the user is on any of the electronic devices 372 in the MDE 370 and asks for restaurant recommendations from YELP around noon, the UI 364 can generate a recommendation of steakhouses located near the user. The relay 366 may then transmits the recommendation to the electronic device 372 that initiated the new query.

Although FIG. 3 illustrates one example of a recommendation system 300 for generating a recommendation, various changes may be made to FIG. 3. For example, the recommendation system 300 may include or be used in conjunction with any suitable number of content providers 302. Also, the recommendation system 300 may include or be used in conjunction with any suitable number of electronic devices 372 in the MDE 370.

Figure 4:
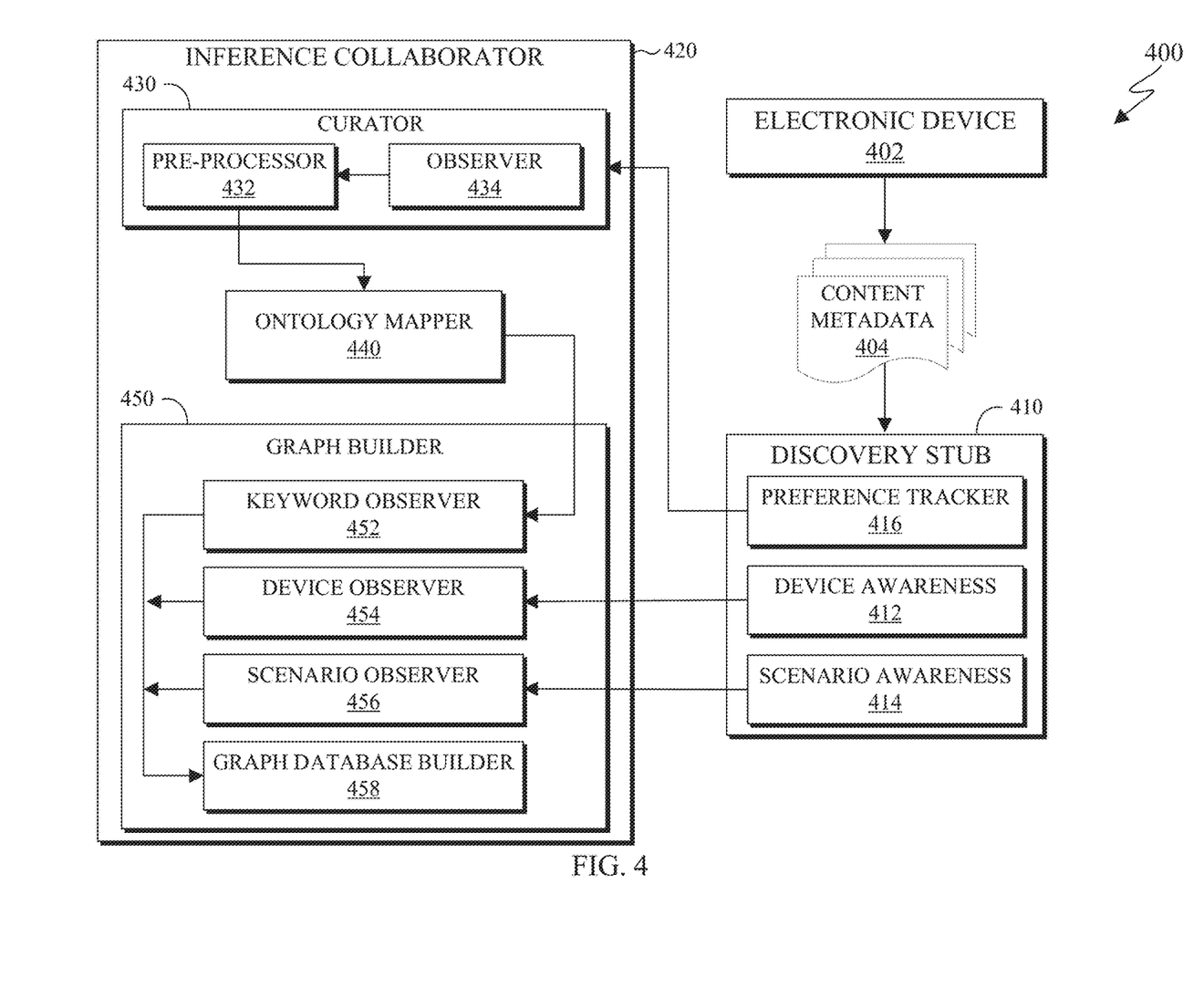
FIG. 4 illustrates an example recommendation system for generating inferences within a graph database in accordance with this disclosure.

FIG. 4 illustrates an example recommendation system 400 for generating inferences within a graph database in accordance with this disclosure. For ease of explanation, the recommendation system 400 may be described as being used in the network configuration 100 of FIG. 1, which might be used in or with the MDE 200 of FIG. 2. However, the recommendation system 400 may be used with any suitable device(s) and in any suitable system(s).

As shown in FIG. 4, the recommendation system 400 includes a discovery stub 410 and an inference collaborator 420. The discovery stub 410 may be the same as or similar to the discovery stub 310 of FIG. 3, and the inference collaborator 420 may be the same as or similar to the inference collaborator 320 of FIG. 3. In some embodiments, the discovery stub 410 and the inference collaborator 420 can be components of an application on, for example, the server 106 and associated with a digital personal assistant that is used by the electronic device 101 of FIG. 1 and/or the electronic devices 220 of FIG. 2. These components can interact with other applications and with outside services. Note, however, that the discovery stub 410 and the inference collaborator 420 can be executed or otherwise provided by other devices, such as the electronic devices 101, 102, 104, and/or 220.

The recommendation system 400 can receive content metadata 404 from an electronic device 402. The electronic device 402 may be the same as or similar to any of the electronic devices 101, 102 and 104 of FIG. 1 and/or any of the electronic devices 220 of FIG. 2. In some embodiments, the electronic device 402 is a standalone device and not associated with any other devices within an MDE. In other embodiments, the electronic device 402 is one electronic device within an MDE, such as the MDE 200 of FIG. 2 or the MDE 370 of FIG. 3. As a specific example, the electronic device 402 could represent a smart speaker, which may be the same as or similar to the smart speaker 220b of FIG. 2.

The electronic device 402 can generate the content metadata 404 when requesting content from a specific content provider such as a music streaming service. The electronic device 402 can also transfer the content metadata 404 to the discovery stub 410. The content metadata 404, an example of which is described in Syntax (6) below, can specify that a query is directed towards a specific content provider (such as a music streaming service), that the requested content is from a particular artist (Carly Rae Jepsen), and that the query is from a specific electronic device 402 (a smart speaker identified as Speaker-123).

Syntax (6)
{ "artist":
    "href": "https://api.ContentProvider.com/v1/artists/6sFIWsNpZYqfjUpaCgueju",
    "id": "6sFIWsNpZYqfjUpaCgueju",
    "name": "Carly Rae Jepsen",
    "type": "artist",
    "uri": "ContentProvider:artist:6sFIWsNpZYqfjUpaCgueju",
    "deviceId": "Speaker-123"
}

The discovery stub 410 receives the content metadata 404 from the electronic device 402. The discovery stub 410 includes a device awareness function 412, a scenario awareness function 414, and a preference tracker 416. The inference collaborator 420 receives various information from the discovery stub 410 and generates or updates a graph database. The inference collaborator 420 includes a curator 430, an ontology mapper 440, and a graph builder 450.

The device awareness function 412 may be the same as or similar to the device awareness function 312 of FIG. 3. The device awareness function 412 can identify a device type and device identifier associated with the electronic device 402 that initiated the query via the content metadata 404. For example, the device awareness function 412 may identify the electronic device 404 as a smart speaker with a device identifier as "Speaker-123," which is indicated via the content metadata 404 shown in Syntax (6). The device awareness function 412 provides information, such as information indicating the identity and type of device, to the device observer 454.

The scenario awareness function 414 may be the same as or similar to the scenario awareness function 314 of FIG. 3. For example, the scenario awareness function 414 may identify patterns associated with the user based on the electronic device 402 and/or other devices of an MDE that includes the electronic device 402 (if one exists). Based on the identified patterns, the scenario awareness function 414 can identify the scenario associated with each query. In this example, the identified scenario is "wakeup" based on the time of day and historical data. The scenario awareness function 414 can provide information to the scenario observer 456.

The preference tracker 416 transmits remaining information of the content metadata 404 to the curator 430. For example, Syntax (7) below shows that the preference tracker 416 transmits all of the content metadata 404 to the curator 430 except for the information identifying the electronic device 402, which is transmitted to the device observer 454 via the device awareness function 412.

Syntax (7)
{ "artist":
    "href": "https://api.ContentProvider.com/v1/artists/6sFIWsNpZYqfjUpaCgueju",
    "id": "6sFIWsNpZYqfjUpaCgueju",

```
"name": "Carly Rae Jepsen",
"type": "artist",
"uri": "ContentProvider:artist:6sFIWsNpZYqfjUpaCgueju",
}
```

The curator 430 may be the same as or similar to the curator 330 of FIG. 3. The curator 430 includes an observer 432 and a pre-processor 434. The observer 432 receives the portion of the content metadata 404 that was forwarded by the preference tracker 416. The pre-processor 434 may be the same as or similar to the pre-processor 334 and can identify keywords from the content metadata 404. The keywords include words or phrases that describe the content provided to the user. For instance, example keywords identified from the portion of the content metadata 404 are shown in Syntax (8) below. The keywords shown in Syntax (8) include a name and a description or type associated with the name, such as artist.

```
Syntax                                      (8)
{
    "name": "Carly Rae Jepsen",
    "type": "artist"
}
```

The ontology mapper 440 may be the same as or similar to the ontology mapper 340. For example, the ontology mapper 440 may identify similar words with the same meanings based on the subject matter and, if needed, replace terms in order to use a uniform terminology in a graph database. As a particular example, a user at one time may request that a digital personal assistant associated with the electronic device 402 play a song by the "singer" Carly Rae Jepsen. During another time, the user may request that the digital personal assistant associated with the electronic device 402 play a song by the "band" Carly Rae Jepsen. As such, the content metadata 404 can identify Carly Rae Jepsen using different terminology. Therefore, the ontology mapper 440 can identify words or terms with similar meanings that are used by a user when requesting content from the content providers, such as "singer" and "band." The ontology mapper 440 then, if needed, selects replacement words from a remote knowledge graph to create a uniform set of words that describe similar items. As an example of this, Syntax (9) below describes that requested content is from content provider such as music streaming service and involves music recording by an artist with the name "Carly Rae Jepsen." The ontology mapper 440 sends Syntax (9) to the keyword observer 452, which provides the keywords to the graph database builder 458.

```
Syntax                                      (9)
{
    "value": "Carly Rae Jepsen",
    "key": "thing.creativework.musicrecording.byartist.person.name "
},
{
    "value": "ContentProvider",
    "key": "thing.creativework.softwareapplication.name"
}
```

The graph builder 450 generates and updates a graph database based on received information from the ontology mapper 440 and additional information received from the discovery stub 410, such as device information and scenario information. The graph database builder 458 may be the same as or similar to the graph database builder 358 of FIG. 3. The graph database builder 458 generates the graph database based on the information from the keyword observer 452, the device observer 454, and the scenario observer 456. The graph database builder 458 also updates the graph database with additional information that is provided by the keyword observer 452, the device observer 454, and the scenario observer 456. For example, the graph database builder 458 may include any additional keywords identified from additional content metadata and associated with one or more domains into the graph database. As another example, the graph database builder 458 may include device information indicating a type of device that initiates an additional query. As yet another example, the graph database builder 458 may include scenario data representing at least one scenario (such as at least one of a time that a query occurred and a location of the electronic device 402 that initiated the query). Thus, the graph database builder 458 can map the keywords from the content providers (obtained via the keyword observer 452) in a linked fashion to the electronic device 402 that initiated the queries to the content providers (obtained via the device observer 454) and the scenarios that are associated with the queries (obtained via the scenario observer 456). In some embodiments, the graph database builder 458 continually updates the graph database based on new content metadata 404 that is associated with queries by the electronic device 402.

Although FIG. 4 illustrates one example of a recommendation system 400 for generating inferences within a graph database, various changes may be made to FIG. 4. For example, the recommendation system 400 may include or be used in conjunction with any suitable number of content providers. Also, the recommendation system 400 may include or be used in conjunction with any suitable number of electronic devices 402.

Figure 5:
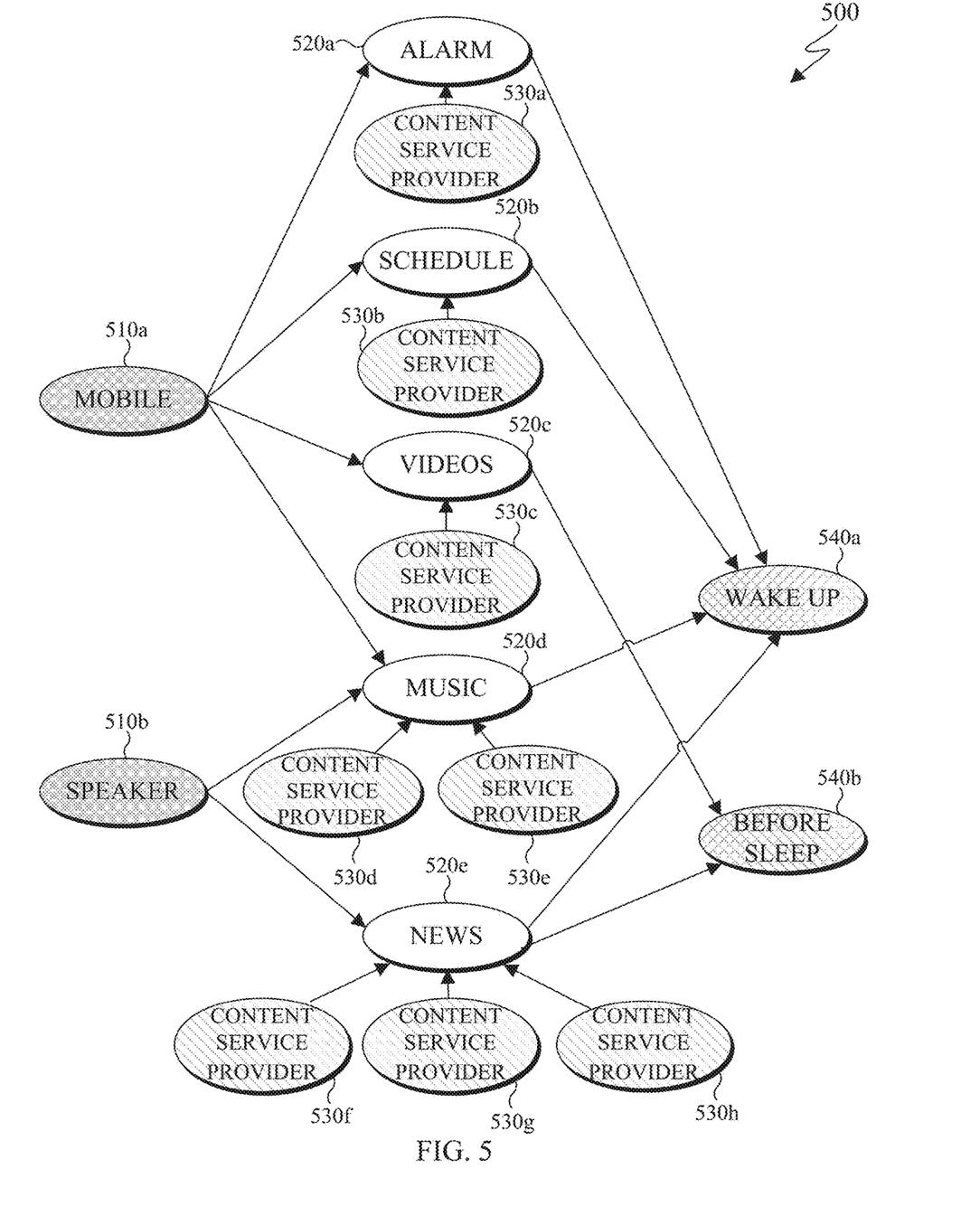
FIG. 5 illustrates an example inference graph database in accordance with this disclosure.

FIG. 5 illustrates an example inference graph database 500 in accordance with this disclosure. For ease of explanation, the inference graph database 500 may be described as being generated and updated by the graph database builder 358 or 458 of FIG. 3 or 4. However, the inference graph database 500 may be used with any suitable device(s) and in any suitable system(s). Depending on the implementation, the inference graph database 500 may be associated with a single user (who may use one or multiple electronic devices), or the inference graph database 500 may be associated with a single device of a user. Privacy can be maintained since different users may not share the same graph database.

As shown in FIG. 5, the graph database 500 is a database that uses graph structures for semantic queries. The graph database 500 includes nodes, edges or relationship paths between the nodes, and properties to represent and store data. The nodes can identify things like one or more electronic devices, one or more scenarios, one or more categories or domains, and one or more content providers. As illustrated here, the graph database 500 illustrates a mobile node 510a and a speaker node 510b (which are collectively referred to as device nodes 510), which represent different electronic devices. The graph database 500 also illustrates an alarm node 520a, a schedule node 520b, a videos node 520c, a music node 520d, and a news node 520e (which are collectively referred to as domain nodes 520). The graph database 500 further illustrates various content provider nodes, such as the content provider nodes 530a, 530b, 530c, 530d, 530e, 530f, 530g, and 530h (which are collectively referred to as content provider nodes 530). In some embodiments, the content provider node 530a could be a clock. The content provider node 530b can be a calendar. The content provider node 530c can be a moving streaming service such as NETFLIX. The content provider nodes 530d and 530e can be music streaming services such as IHEARTRADIO or SPOTIFY. The content provider nodes 530f, 530g, and 530h can be news streaming services such as local news, sports, and NPR. In addition, the graph database 500 illustrates a wakeup node 540a and a before sleep node 540b (which are collectively referred to as scenario nodes 540).

Edges that indicate relationships between various nodes allow data to be linked together directly and can allow for data to be retrieved in one operation. For example, given a particular device, scenario, domain, and content provider, the graph database 500 can store the historical data associated therewith such that a recommendation can be generated. As illustrated here, each device node 510 can be related to one or more domains nodes 520. Also, each domains node 520 can be related to one or more scenario nodes 540 as well as to one or more content provider nodes 530. As such, upon receiving a unique key, the graph database 500 can return information that is associated (via the edges) with certain nodes to generate a recommendation.

Although FIG. 5 illustrates one example of an inference graph database 500, various changes may be made to FIG. 5. For example, the inference graph database 500 may include any suitable number of nodes and any suitable number of edges linking those nodes. Also, the nodes in the inference graph database 500 may represent any suitable electronic devices, domains, and scenarios.

Figure 6:
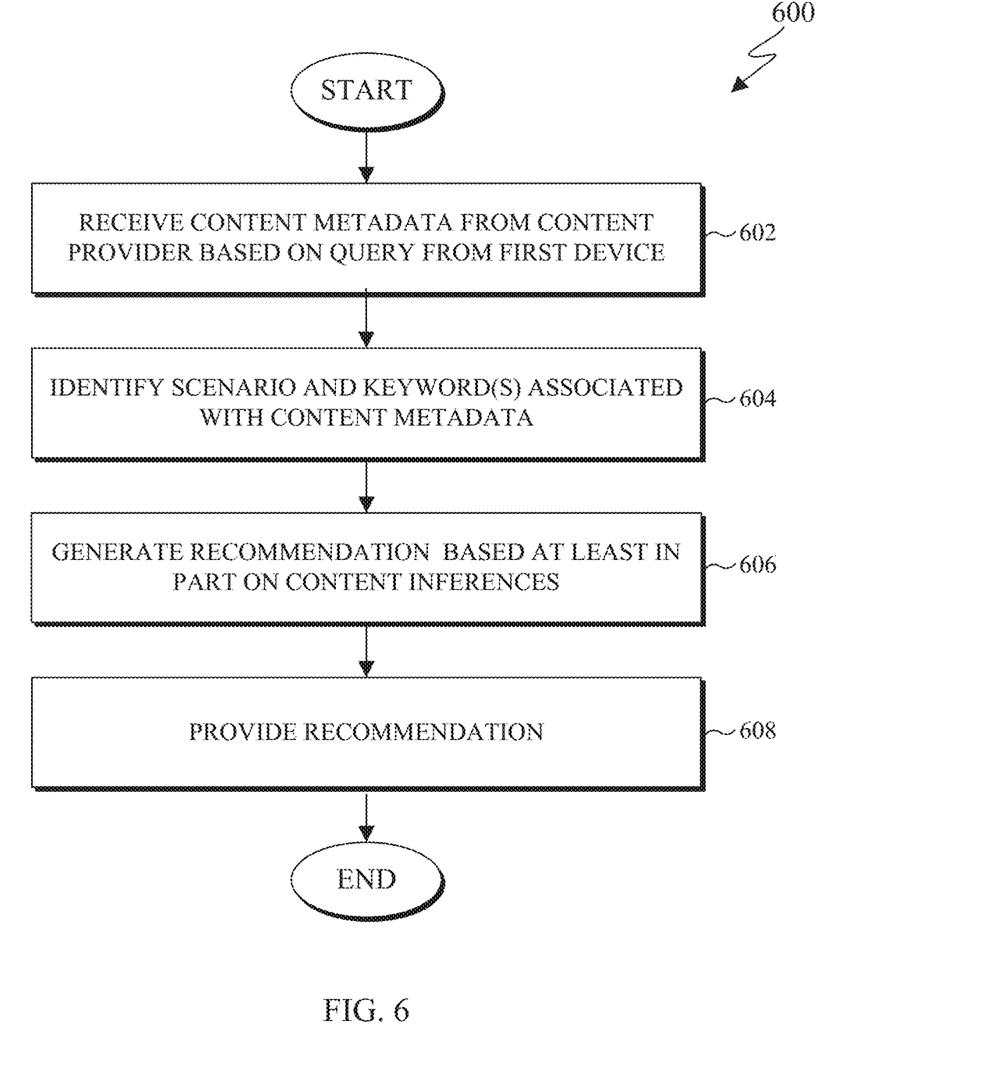
FIG. 6 illustrates an example method for generating a recommendation in accordance with this disclosure.

FIG. 6 illustrates an example method 600 for generating a recommendation in accordance with this disclosure. For ease of explanation, the method 600 may be described as being performed by the processor 120 of the electronic device 101 in the network configuration 100 of FIG. 1. However, the method 600 may be performed using any suitable device(s) and in any suitable system(s).

In step 602, the processor 120 receives content metadata from a content provider. The content metadata can be obtained by the processor 120 when a first electronic device requests content from the content provider. The content metadata can identify at least one of the content provider, the device that requested the content, and information concerning the query. The information concerning the query can change based on, among other things, the category or domain associated with the query. For example, if the query is associated with the music domain, the information can include at least one of the artist, album, genre, recording date, and the like. As another example, if the query is associated with the movies domain, the information can include the lead actor/actress, the release date of the movie, the title of the movie, the genre of the movie, and the like. As yet another example, if the query is associated with the news domain, the information can include the location of the requested news (such as local, national, or international), subject matter (such as weather, politics, or crime), and the like.

In step 604, the processor 120 identifies a scenario and at least one keyword associated with the content metadata. For example, the processor 120 can identify a scenario that describes a pattern associated with the electronic device when the query was initiated. As a particular example, the processor 120 can identify the scenario based on time, location, calendar entry, or indication from the query itself. The processor 120 also identifies one or more keywords describing the requested content from the content metadata.

In step 606, the processor 120 generates a recommendation based at least in part on content inferences associated with the first electronic device stored in a database. The content inferences are based on relating the scenario to previously-identified scenarios and relating the keyword(s) to previously-identified keywords. As such, the processor 120 can identify a recommendation for the current query. In step 608, the processor 120 provides the recommendation. For example, the processor 120 can provide the recommendation to the first electronic device that requested the content from the content provider. As another example, the processor 120 can provide the recommendation to one or more second electronic devices that are included in an MDE with the first electronic device. This supports the use of the recommendation in a single-device environment and in an MDE.

Although FIG. 6 illustrates one example of a method 600 for generating a recommendation, various changes may be made to FIG. 6. For example, while shown as a series of steps, various steps in FIG. 6 may overlap, occur in parallel, occur in a different order, or occur any number of times.

Although the present disclosure has been described with reference to various example embodiments, various changes and modifications may be suggested to one skilled in the art. It is intended that the present disclosure encompass such changes and modifications as fall within the scope of the appended claims.

What is claimed is:

1. An electronic device comprising:
at least one memory configured to store a graph database; and
at least one processor coupled to the at least one memory, the at least one processor configured to:
receive content metadata from a content provider based on a query from a first device;
identify a scenario and a keyword associated with the content metadata;
generate a recommendation based at least in part on content inferences associated with the first device stored in the graph database through relating the scenario to previously-identified scenarios and relating the keyword to previously-identified keywords; and
provide the recommendation;
wherein, to generate the recommendation, the at least one processor is configured to:
identify a domain based on the scenario and the keyword;
identify a provider associated with the domain based on historical data represented in the graph database, the provider representing one of a plurality of content providers;
identify content associated with the provider based on the historical data; and
generate the recommendation in a format that corresponds to the domain.

2. The electronic device of claim 1, wherein:
the first device is one of a plurality of connected devices within a multi-device environment; and
the content inferences are also associated with the plurality of connected devices.

3. The electronic device of claim 2, wherein the content inferences are based on (i) mapping of each of the plurality of connected devices to one or more domains and (ii) mapping of each of the one or more domains to one or more content providers and one or more scenarios.

4. The electronic device of claim 3, wherein:
the at least one processor is further configured to update the graph database with additional information from any of the plurality of connected devices; and
the additional information includes:
additional keywords identified from additional content metadata and associated with the one or more domains;
device information indicating a type and identifying information of the first device that initiates an additional query; and
scenario data representing a time that the query occurred and a location of the first device at the time of the additional query.

5. The electronic device of claim 2, wherein, to provide the recommendation, the at least one processor is configured to:
determine which of the plurality of connected devices will receive the recommendation;
in response to a determination to provide the recommendation to the first device, provide the recommendation to the first device;
in response to a determination to provide the recommendation to a second device of the plurality of connected devices, identify a user interface associated with the second device; and
modify the recommendation to correspond to the user interface associated with the second device.

6. The electronic device of claim 2, wherein the at least one processor is configured to:
identify the domain based also on a type of the first device;
generate the recommendation for the first device; and
transmit the recommendation to the first device.

7. The electronic device of claim 1, wherein:
to identify the scenario, the at least one processor is configured to identify a usage pattern based on at least one of a time that the query is received and a location of the first device at the time of the query; and
to identify the keyword, the at least one processor is configured to identify information associated with the query including a domain and details of the content provider.

8. A method comprising:
receiving content metadata from a content provider based on a query from a first device;
identifying a scenario and a keyword associated with the content metadata;
generating a recommendation based at least in part on content inferences associated with the first device stored in a graph database through relating the scenario to previously-identified scenarios and relating the keyword to previously-identified keywords; and
providing the recommendation;
wherein generating the recommendation comprises:
identifying a domain based on the scenario and the keyword;
identifying a provider associated with the domain based on historical data represented in the graph database, the provider representing one of a plurality of content providers;
identifying content associated with the provider based on the historical data; and
generating the recommendation in a format that corresponds to the domain.

9. The method of claim 8, wherein:
the first device is one of a plurality of connected devices within a multi-device environment; and
the content inferences are also associated with the plurality of connected devices.

10. The method of claim 9, wherein the content inferences are based on (i) mapping of each of the plurality of connected devices to one or more domains and (ii) mapping of each of the one or more domains to one or more content providers and one or more scenarios.

11. The method of claim 10, further comprising:
updating the graph database with additional information from any of the plurality of connected devices;
the additional information includes:
additional keywords identified from additional content metadata and associated with the one or more domains;
device information indicating a type and identifying information of the first device that initiates an additional query; and
scenario data representing a time that the query occurred and a location of the first device at the time of the additional query.

12. The method of claim 9, wherein providing the recommendation comprises:
determining which of the plurality of connected devices will receive the recommendation;
in response to a determination to provide the recommendation to the first device, providing the recommendation to the first device;
in response to a determination to provide the recommendation to a second device of the plurality of connected devices, identifying a user interface associated with the second device; and
modifying the recommendation to correspond to the user interface associated with the second device.

13. The method of claim 9, wherein:
the domain is identified based also on a type of the first device;
the recommendation is generated for the first device; and
providing the recommendation comprises transmitting the recommendation to the first device.

14. The method of claim 8, wherein:
identifying the scenario comprises identifying a usage pattern based on at least one of a time that the query is received and a location of the first device at the time of the query; and
identifying the keyword comprises identifying information associated with the query including a domain and details of the content provider.

15. A non-transitory computer readable medium receive content metadata from a content provider based on a query from a first device;
identify a scenario and a keyword associated with the content metadata;
containing instructions that when executed cause at least one processor to:
generate a recommendation based at least in part on content inferences associated with the first device stored in a graph database through relating the scenario to previously-identified scenarios and relating the keyword to previously-identified keywords; and
provide the recommendation;
wherein the instructions that when executed cause the at least one processor to generate the recommendation comprise instructions that when executed cause the at least one processor to:

identify a domain based on the scenario and the keyword;

identify a provider associated with the domain based on historical data represented in the graph database, the provider representing one of a plurality of content providers;

identify content associated with the provider based on the historical data; and generate the recommendation in a format that corresponds to the domain.

16. The non-transitory computer readable medium of claim 15, wherein:

the first device is one of a plurality of connected devices within a multi-device environment; and the content inferences are also associated with the plurality of connected devices.

17. The non-transitory computer readable medium of claim 16, wherein the content inferences are based on (i) mapping of each of the plurality of connected devices to one or more domains and (ii) mapping of each of the one or more domains to one or more content providers and one or more scenarios.

18. The non-transitory computer readable medium of claim 17, wherein:

the instructions when executed further cause the at least one processor to update the graph database with additional information from any of the plurality of connected devices; and the additional information includes:

additional keywords identified from additional content metadata and associated with the one or more domains;

device information indicating a type and identifying information of the first device that initiates an additional query; and scenario data representing a time that the query occurred and a location of the first device at the time of the additional query.

19. The non-transitory computer readable medium of claim 16, wherein the instructions that when executed cause the at least one processor to provide the recommendation comprise:

instructions that when executed cause the at least one processor to:

determine which of the plurality of connected devices will receive the recommendation;

in response to a determination to provide the recommendation to the first device, provide the recommendation to the first device;

in response to a determination to provide the recommendation to a second device of the plurality of connected devices, identify a user interface associated with the second device; and modify the recommendation to correspond to the user interface associated with the second device.

20. The non-transitory computer readable medium of claim 15, wherein:

the instructions that when executed cause the at least one processor to identify the scenario comprise:

instructions that when executed cause the at least one processor to identify a usage pattern based on at least one of a time that the query is received and a location of the first device at the time of the query; and the instructions that when executed cause the at least one processor to identify the keyword comprise:

instructions that when executed cause the at least one processor to identify information associated with the query including a domain and details of the content provider.

* * * * *